(12) United States Patent
Janssen et al.

(10) Patent No.: US 7,492,677 B2
(45) Date of Patent: Feb. 17, 2009

(54) METHOD AND DEVICE FOR PLAYING OPTICAL DISCS AND METHOD FOR DETERMINING TRACKING QUALITY

(75) Inventors: Anthonius Petrus Gerardus Emanuel Janssen, Eindhoven (NL); Jacobus Maarten Den Hollander, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 387 days.

(21) Appl. No.: 10/571,626

(22) PCT Filed: Aug. 23, 2004

(86) PCT No.: PCT/IB2004/051527
§ 371 (c)(1),
(2), (4) Date: Mar. 14, 2006

(87) PCT Pub. No.: WO2005/027102
PCT Pub. Date: Mar. 24, 2005

(65) Prior Publication Data
US 2007/0058512 A1    Mar. 15, 2007

(30) Foreign Application Priority Data
Sep. 16, 2003   (EP) .................................. 03103408

(51) Int. Cl.
*G11B 7/00*    (2006.01)
(52) U.S. Cl. .................. 369/44.28; 369/44.32
(58) Field of Classification Search .............. 369/44.27, 369/44.28, 44.29, 44.32
See application file for complete search history.

(56) References Cited

U.S. PATENT DOCUMENTS 5,450,388 A * 9/1995 Baas ....................... 369/44.32

\* cited by examiner

*Primary Examiner*—Nabil Z Hindi
(74) *Attorney, Agent, or Firm*—Michael E. Belk

(57) ABSTRACT

A method for reading data from a track (3) of a data carrier (2) comprises the following steps. During reading, a tracking quality parameter (Q) is determined, relating to a track portion (3Px) of the data carrier from which the data is being read. The tracking quality parameter is stored in a tracking performance memory (30) in relation to the corresponding track portion (3Px). If a jump back to a previously read track portion appears to be necessary, said tracking performance memory (30) is consulted to determine a target track portion (3P(x-n)) having a sufficient value of the tracking quality parameter (Q); then, a jump back (JB) to the target track portion (3P(x-n)) thus determined is performed.

15 Claims, 3 Drawing Sheets

Figure 1:
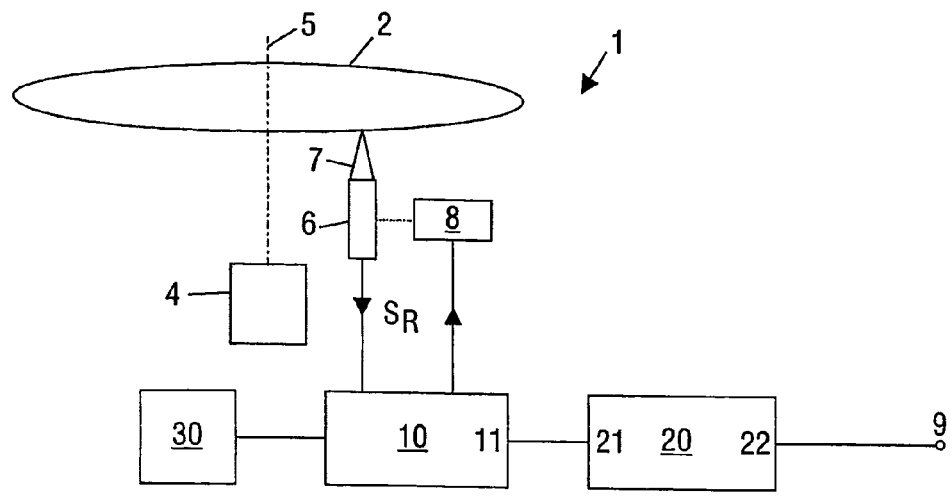

METHOD AND DEVICE FOR PLAYING OPTICAL DISCS AND METHOD FOR DETERMINING TRACKING QUALITY

The present invention relates in general to a method for reading data from a data carrier. Specifically, the present invention relates to a method for reading data from an optical storage disc; the invention will hereinafter be explained for the example of a DVD-disc without it being intended to restrict the scope of the invention.

As is commonly known, an optical storage disc comprises at least one track, either in the form of a continuous spiral or in the form of multiple concentric circles, of storage space where information may be stored in the form of a data pattern. For reading information from the disc, an optical disc drive comprises, on the one hand, rotating means for receiving and rotating an optical disc, and on the other hand an optical pickup which is mounted radially displaceable, for scanning the storage track with a laser beam. Since the technology of optical discs in general, the way in which information can be stored in an optical disc, and the way in which optical data can be read from an optical disc, is commonly known, it is not necessary here to describe this technology in more detail.

During operation, the disc is rotated at a certain rotational speed, resulting in a read data stream having a certain data rate. Via a buffer memory, the disc drive provides this data stream as output stream, for an application such as a computer program running on a PC. The data rate of the output data stream should correspond to the data rate requested by the application. By way of example of an application, a DVD video playback is mentioned. For playing a movie from DVD without interruptions, the DVD playback application needs to receive a stream of data (real-time video and audio) at a certain output data rate.

The data rate requested by the application can vary quickly. One possibility for the disc drive to always provide the requested data rate is to change the rotational frequency quickly, following the requests made by the application. However, this is not desired as speed changes require much energy. Therefore, the disc drive comprises a data buffer. The data as read from disc by the disc drive is fed into said buffer memory; the application reads the data from the buffer memory, at a variable rate. Thus, the filling level of the buffer memory may vary with time.

Still, the disc drive may have variable disc rotation frequency, wherein the speed changes are now mitigated by the buffer, but substantial energy savings can only be achieved with unreasonably large buffers. Therefore, it is preferred that the disc drive has a fixed or slowly varying disc rotation frequency.

The rotation frequency of the disc may not be chosen too low: in that case, a buffer-underrun will occur, i.e. the average data output rate from the buffer is larger than the data input rate into the buffer, and the buffer becomes empty. In the case of a video playback, this would result in an interruption of the playback. To avoid this, the disc rotation frequency is set at a relatively high level, guaranteeing a data rate higher than the maximum data rate as requested by the application. This specific rotational frequency is called "overspeed". As a consequence, a buffer overrun will occur, i.e. the buffer becomes full. This means that the disc drive has to jump back some tracks, in order to read again the data that could not be stored in the buffer.

The overspeed factor (i.e. the ratio between read data rate and application read rate, i.e. the ratio between buffer input rate and buffer output rate), cannot be chosen marginally larger than 1. If read errors occur, the disc drive also has to jump back in order to retry to read the corresponding data; during this retry, the application should be able to continue reading data from said buffer memory, and the buffer filling level should be large enough to allow this. On the other hand, after a retry, the disc drive should bring back the buffer memory to its filling level as soon as possible. As a consequence of the relatively high overspeed factor, the disc drive has to jump back relatively often, even under normal circumstances. In case of a bad disc, e.g. a heavily scratched disc, many read errors occur, and the jumps back occur even more frequently.

A problem associated with jumps is that, after each jump, the disc drive has to regain tracking and possibly focus. Even in the case of a good disc, this will take some time. In the case of a bad disc, e.g. a heavily scratched disc, regaining tracking and/or focus may prove to be very difficult and take a long time, to such extent, that the target track is missed and a further retry is necessary, increasing the risk of a buffer underrun.

A main objective of the present invention is to reduce these problems.

According to an important aspect of the present invention, a method for reading data from a track of a data carrier, comprises the steps of:

tracking the track while reading data from the track, using a tracking performance memory which contains information relating to a tracking quality of track portions of the data carrier, to determine, in situations where tracking has to be restored, which track portion to jump to for restoring tracking.

The tracking performance memory can be a memory chip on board of an optical disc drive, or any other memory which can also be located outside the disc drive. For instance, the tracking performance memory can be a database which is maintained on the internet. Alternatively, the tracking performance memory may be a memory located on a central computer system in a network.

The tracking can be lost due to for instance an external shock. Also during a jump from one track portion to another, tracking may be lost and has to be restored. When using the tracking performance memory, a track portion can be selected which has a good tracking quality, i.e. a track portion on which the tracking can be relatively easy restored.

In a further embodiment of the invention the method further comprises the steps of:

during reading, determining a tracking quality parameter relating to a track portion of the data carrier from which the data is being read;

storing the tracking quality parameter in the tracking performance memory in relation to the corresponding track portion.

In this embodiment the tracking performance memory is maintained by this method by storing the tracking quality parameter in this memory. Alternatively, the memory is filled using an other method or apparatus.

In a still further embodiment the method further comprises the steps of:

determining if a jump back to a previously read track portion is necessary;

if a jump back to a previously read track portion appears to be necessary, consulting said tracking performance memory to determine a target track portion having a sufficient value of the tracking quality parameter;

jumping back to the target track portion thus determined.

In this embodiment, a disc drive maintains a quality memory which contains information relating to the quality of track portions being read. Later, when a jump back is considered necessary, the information in this quality memory is consulted to determine a target location for the jump. This target location is selected such that it lies in a "good" track portion, i.e. a track portion of which it is expected that tracking and/or focus will be regained relatively easily and therefore quickly.

According to another aspect of the invention a method of determining a tracking quality of track portions of a data carrier, comprises the steps of:

tracking the track;

during tracking, determining a tracking quality parameter relating to a track portion of the data carrier;

storing the tracking quality parameter in a tracking performance memory in relation to the corresponding track portion.

The tracking performance memory can be advantageously utilized in the method for reading data according to the invention.

Figure 2:
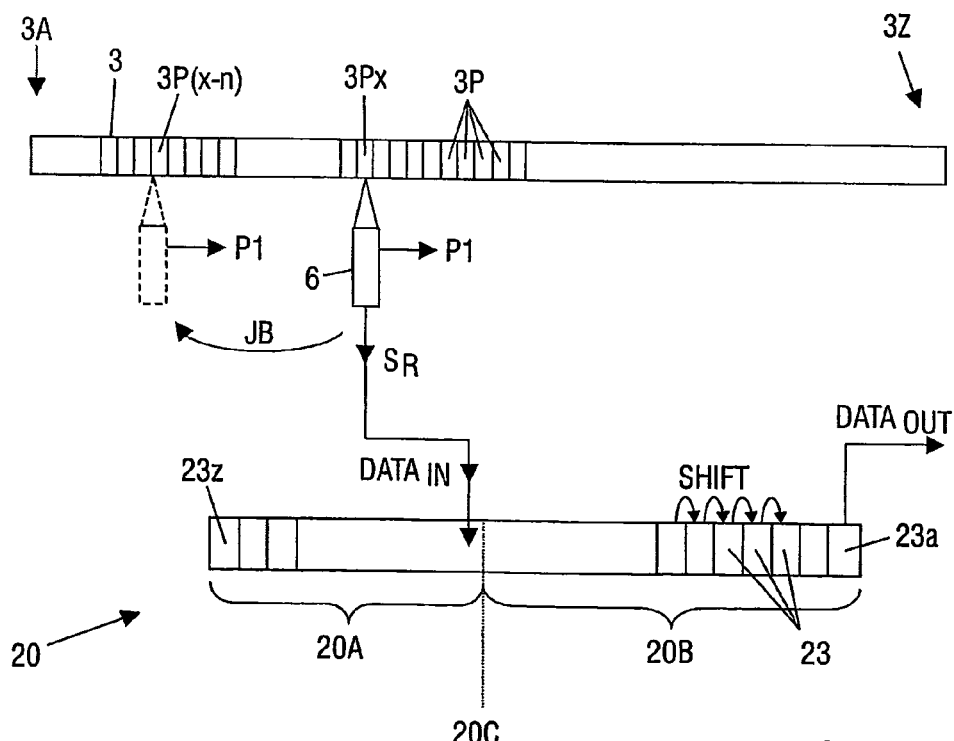
Figure 3:
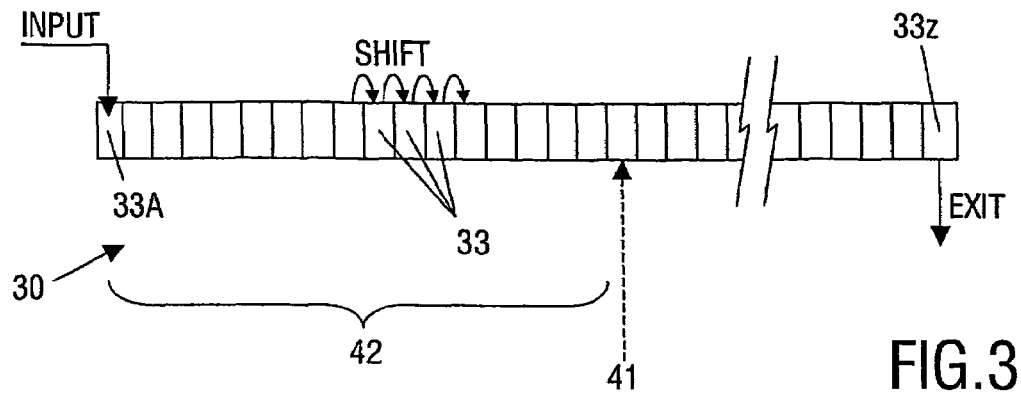
Figure 4A:
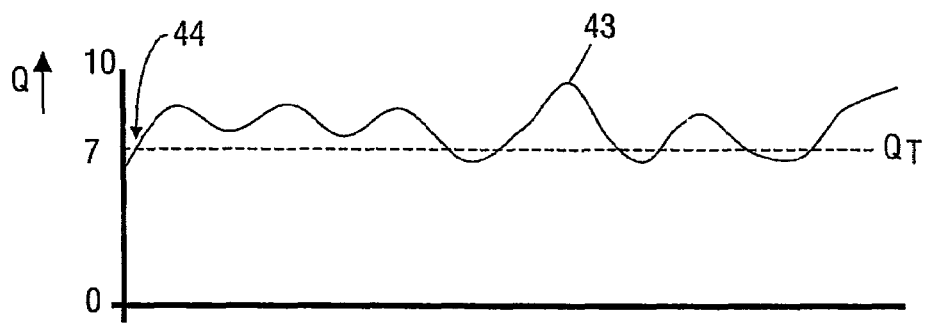
Figure 4B:
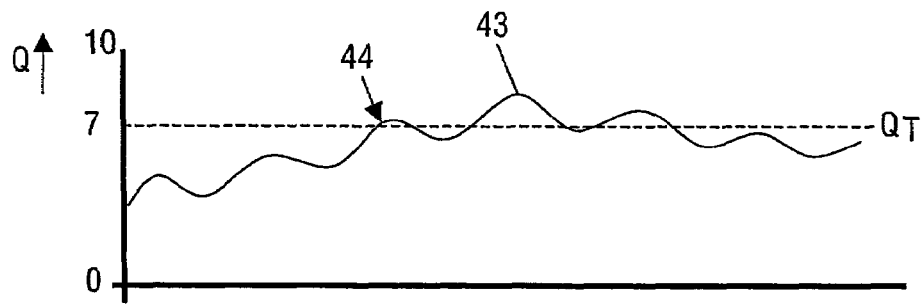
Figure 4C:
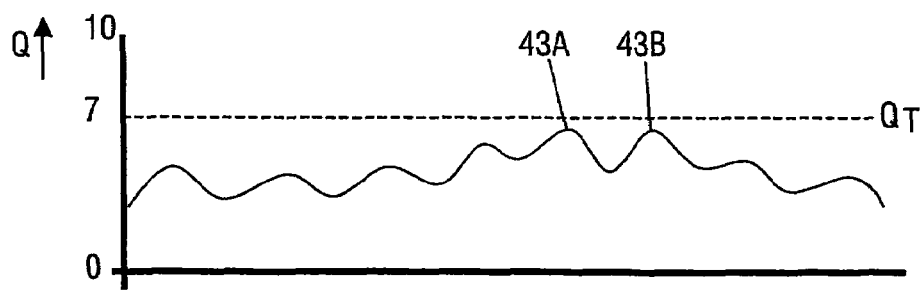
Figure 5:
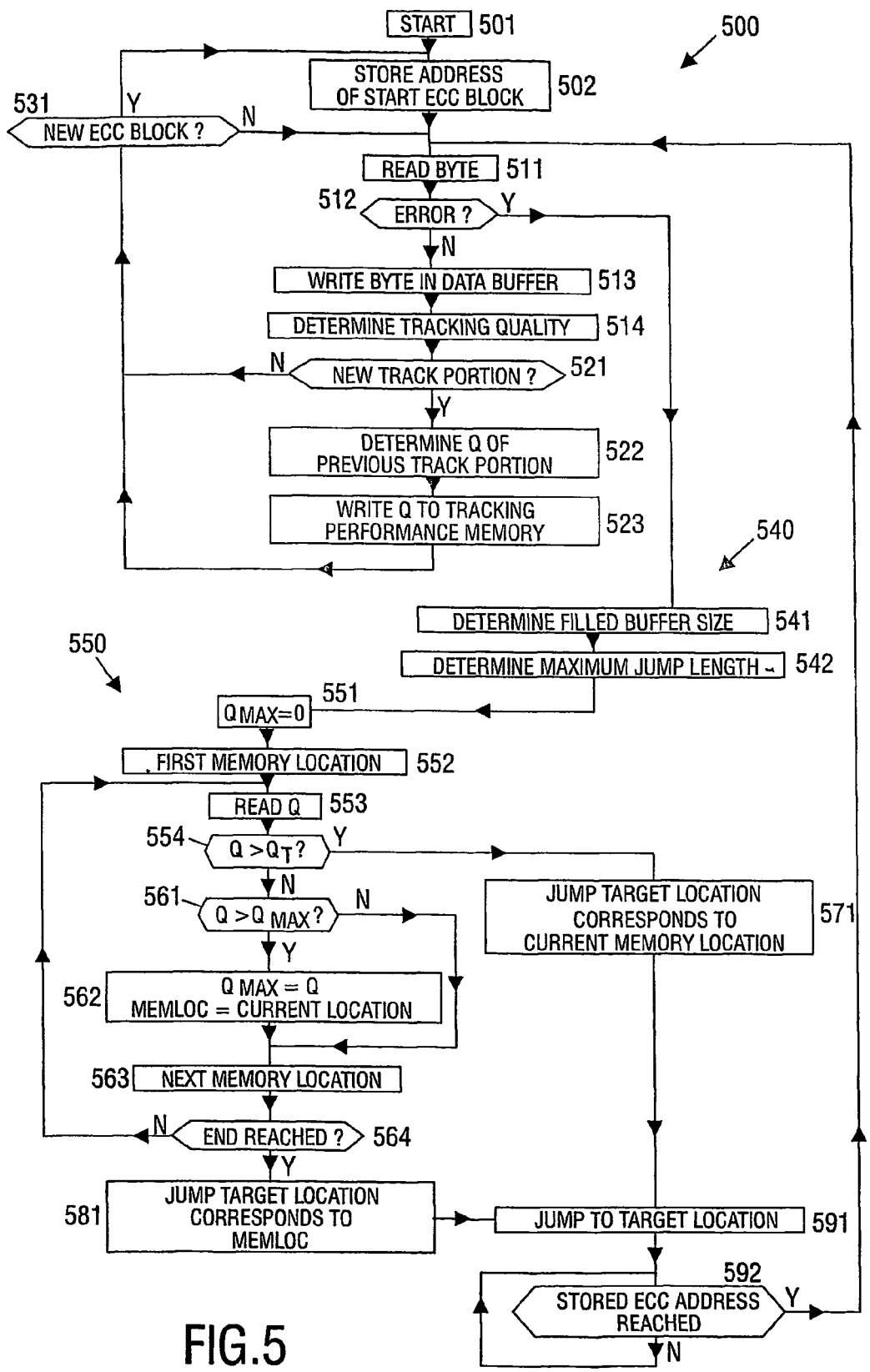

These and other aspects, features and advantages of the present invention will be further explained by the following description with reference to the drawings, in which same reference numerals indicate same or similar parts, and in which:

FIG. 1 schematically shows relevant components of a disc drive;

FIG. 2 schematically illustrates data reading and buffering;

FIG. 3 schematically illustrates the operation of a tracking performance memory;

FIGS. 4A-C are graphs schematically showing exemplary content of the tracking performance memory;

FIG. 5 is a flow diagram illustrating a read procedure.

FIG. 1 schematically shows relevant components of a disc drive 1 for reading information from an optical disc 2, for instance a DVD disc. For rotating the disc 2, the disc drive 1 comprises a motor 4 fixed to a frame (not shown for sake of simplicity), defining a rotation axis 5. The disc drive further comprises an optical pickup 6, which comprises means for generating a laser beam 7, focusing the laser beam 7 on an information layer of the disc 2, receiving reflected laser light, and generating a read signal $S_R$ which is received by a controller 10. The optical pickup 6 is mounted radially displaceable, and the disc drive 1 comprises a radial actuator 8, which is controlled by the controller 10, for controlling the radial position of the pickup 6 such that the laser beam 7 follows a track (not shown for sake of simplicity) of the disc 2 or is jumped to a different track position.

Since optical disc drives are known per se, and the technology of radially displaceable optical pickups for reading tracks of optical discs is known per se, a more detailed explanation of the optical pickup 6 and the controller 10 is omitted here.

The disc drive 1 further comprises a data buffer memory 20, having an input 21 coupled to a first output 11 of the controller 10, and having an output 22 coupled to an output 9 of the disc drive 1.

The operation of a read procedure of the disc drive 1 is explained with reference to FIG. 2, which illustrates a track 3 of the disc 2 as a longitudinal strip of data. The track 3 has a beginning 3A and an end 3Z. Usually, the beginning 3A corresponds to the inner radius of the disc while the end 3Z corresponds to the outer radius of the disc. The pickup 6 is shown at a certain position with respect to the track 3. By virtue of the rotation of the disc 2, the pickup 6 scans the track 3, illustrated by arrow P1 in FIG. 2, and a data signal $S_R$, corresponding to the data read from track 3, is generated and received by the controller 10.

In FIG. 2, the buffer memory 20 is illustrated as a longitudinal strip of memory locations 23. Reference numeral 20A indicates an empty portion of the buffer memory 20 where the memory locations do not contain relevant data, while reference numeral 20B indicates a filled portion of the buffer memory 20 where the memory locations are filled with relevant data. The boundary between the empty memory portion 20A and the filled memory portion 20B is indicated at 20C. The controller 10 stores new data read from track 3 always at the first memory location of the empty memory portion 20A, as indicated by arrow $DATA_{IN}$, thus decreasing the size of the empty memory portion 20A and increasing the size of the filled memory portion 20B, in other words shifting the boundary 20C to the left in FIG. 2. An application always reads data from the first memory location 23a of the filled memory portion 20B, as indicated by arrow $DATA_{OUT}$. After such read process, the contents of the memory locations 23 of the filled memory portion 20B are shifted to the corresponding neighboring memory locations 23 towards in a direction towards the said first memory location 23a of the filled memory portion 20B, as indicated by arrows SHIFT. After such shift process, said first memory location 23a of the filled memory portion 20B again contains the next data to be read by the application. The shift process increases the size of the empty memory portion 20A and decreases the size of the filled memory portion 20B, in other words shifts the boundary 20C to the right in FIG. 2.

In operation, the position of the boundary 20C will vary, depending on the input data rate (which is constant in the case of video playback) and the output data rate (which varies, depending on the actual compression rate of the data stored on disc). In order to avoid a buffer-underrun (which means that the boundary 20C meets the first memory location 23a of the filled memory portion 20B, so that the entire buffer memory 20 is empty), the average input data rate should be higher than the maximum output data rate, so that eventually a buffer-overrun occurs, which means that the boundary 20C meets the last memory location 23z of the empty memory portion 20A, so that the entire buffer memory 20 is full. If reading now continues, the read data cannot be stored in the buffer memory 20, so that a playback error would result; this is avoided by a jump back of the optical pickup.

In operation, it may also happen that a read error occurs, for instance due to scratches on the disc surface. In that case, the corresponding data cannot be stored in the buffer memory as well, and a playback error would occur also. Again, this is avoided by a jump back of the optical pickup.

Such a jump back is indicated by the arrow JB in FIG. 2. The pickup 6 is moved back to a location before the location where the error occurred, i.e. to a location closer to the beginning 3A; the location after jump back is indicated in dotted lines in FIG. 2. From the new location after jump back, the optical pickup 6 starts to read again (in the direction of said arrow P1), but it takes some time before the pickup has regained tracking and/or focus. During this time, as well as during the jump, the output of data from buffer 20 to the application continues, resulting in the decrease of the size of the filled memory portion 20B. Filling of the buffer is resumed when the optical pickup 6 arrives at the location where the read error occurred, or where the buffer-overrun occurred. More precisely: filling of the buffer is resumed when the optical pickup 6 arrives at the end of the last complete ECC block that was read correctly from disc.

In the state of the art, the jump back has a fixed length, or the target arrival of the jump is selected in accordance with the contents of the data on disc, for instance just before a $V_{SYNC}$. A problem of such prior art approach is that, depending on the quality of the disc, there exists a chance that the jump may end in an area with bad tracking quality, for instance an area with a badly scratched surface, which makes it very difficult to regain tracking and/or focus.

According to a special feature of the present invention, this chance is reduced by assuring that the jump ends in an area with good tracking quality. To this end, the disc drive 1 further comprises a tracking performance memory 30, and the controller 10, during playback, determines a value of a tracking quality parameter as a measure of the tracking performance of the disc, and stores this parameter in the tracking performance memory 30. This will be explained in more detail with reference to FIG. 3, where the tracking performance memory 30 is illustrated as a longitudinal step of memory locations 33. This memory 30 may be considered to be a shift memory, having a first or input memory location 33a and a last memory location 33z. In each write action by the controller 10, the controller writes information into the input memory location 33a while the contents of each memory location 33 is shifted one memory location away from the input memory location 33a, i.e. to the right in FIG. 3, as indicated by arrows SHIFT in FIG. 3; the contents of the last memory location 33z is thrown away, as indicated by arrow EXIT.

Defining and measuring the tracking quality parameter, indicated hereinafter simply as Q, can be done in various ways. For instance, Q can be derived from the shape of an error signal, such as the error signals involved in beam focus control and track following control, as will be known to persons skilled in this art. But other signals or combinations of signals can also be used. In the following, for the sake of exemplary discussion, it will be assumed that Q can take a value between 0 and 10, wherein 10 indicates ideal tracking quality and 0 indicated very bad tracking quality with many errors, but it is to be understood that this is not intended to restrict the invention.

Further, a predetermined tracking quality threshold $Q_T$ is determined, which is a value of Q which is considered to be "good enough". In other words, if the Q of a track portion has a value above $Q_T$, this track portion is available as jump target. In this example, in which Q can range from 0 to 10, it will be assumed that $Q_T=7$.

In principle, Q can be determined in association with each data byte, but such high resolution is not necessary; in practice, it suffices if Q is determined in association with track portions having a predefined length. For instance, each 360° track may be subdivided into 64 track portions of 5.625°, but another subdivision will also be possible. A value of Q is determined for each such track portion; therefore, in hiss example, after each revolution of the disc 2, 64 samples of Q are written into the tracking performance memory 30. Further, assume that it is desirable to be able to jump as far back as 32 tracks. This corresponds to 32×64 track portions which are potential jump targets. Therefore, for this example, the tracking performance memory 30 needs to have only 2048 memory locations.

In FIG. 2, track portions are generally indicated at reference numeral 3P; individual track portions are distinguished by adding index 1, 2, 3, . . . i, . . . etc.

FIGS. 4A-C are graphs showing the content of the tracking performance memory 30 for different hypothetical discs, illustrating possible examples of the tracking quality of a disc.

In the case illustrated in FIG. 4A, the disc has very good tracking quality in all disc regions except a few exceptions: in such case, there are only few restrictions to the locations where a jump might end.

In the case illustrated in FIG. 4B, the disc has bad tracking quality. Almost in all locations, Q is below $Q_T$; only three areas have a Q above $Q_T$.

In the case illustrated in FIG. 4C, the disc has very bad tracking quality: Q is always below $Q_T$.

In the following, a preferred example of a jump strategy will be described, for determining a jump target location.

First, at the moment of encountering the error, the maximum jump length is determined, which depends on the position of the boundary 20C, i.e. the size of the filled memory portion 20B. If the buffer memory 20 is almost empty, the jump can only be relatively short, whereas the jump can be relatively long if the buffer memory 20 is almost full. After all, the length of the jump determines how much time is needed before the error location is reached again, and this should correspond to the playtime left in the buffer memory. The maximum jump length corresponds to a maximum jump location in the tracking performance memory 30, indicated as maximum boundary 41. The portion of the tracking performance memory 30 between said maximum boundary 41 and the first memory location 33A will be indicated as available jump area 42.

It is possible that the jump strategy determines the memory location with highest Q within the available jump area 42. In the examples of FIGS. 4A-C, this memory location is indicated as maximum tracking quality location 43. However, such is not necessary in the cases illustrated in FIGS. 4A and 4B, when the disc has a sufficient number of track portions having a Q above $Q_T$. In that case, a strategy preferred in view of its simplicity results in a jump to the closest track portion 3P(x-n), i.e. having the smallest value of n, for which the corresponding memory location contains a Q above $Q_T$, indicated at 44 in FIGS. 4A and 4B. In the above, 3Px indicates the current track portion, and n indicates the jump length in track portions.

In a very bad case, as illustrated in FIG. 4C, where Q is always below $Q_T$, the jump strategy determines the "best" location as being the "least bad" location, i.e. the memory location with highest Q within the available jump area 42. A jump ending in track portion corresponding to this "best" location has the highest probability of regaining tracking and focus within a reasonable time.

In the example of FIG. 4C, the highest Q occurs at two memory locations, indicated at 43A and 43B. It is possible to decide to jump to the track portion $3P(x-n_A)$ corresponding to the closest "best" location 43A, i.e. having the smallest value of n. In that case, the jump is relatively short. If regaining tracking and/or focus fails, the time left for a retry is as large as possible.

On the other hand, it is also possible to decide to jump to the track portion $3P(x-n_B)$ corresponding to the most remote "best" location 43B, i.e. having the largest value of n. In that case, the jump is relatively long, giving the disc drive more time to regain tracking and focus before reaching the current location 3Px again. It is noted that, after having landed on the track portion $3P(x-n_B)$ corresponding to the most remote "best" location 43B, if the disc drive is not immediately successful with regaining tracking and focus, the disc drive comes to pass the track portion $3P(x-n_A)$ corresponding to the closest "best" location 43A, and thus has a second opportunity for regaining tracking and focus at the target track location which would have been decided by the jump strategy mentioned earlier.

The invention will now be described in more detail with reference to FIG. 5, which is a flow diagram illustrating an embodiment of a read procedure 500 in accordance with the invention.

The procedure starts [step 501] when the start address of an ECC block is reached; this address is stored in an ECC start memory [step 502].

The track of the disc is scanned, and the read signal is decoded to read the bytes contained therein [step 511]. In step 512, it is determined whether an error occurs, such as a read error or a buffer overrun. If no error occurs, the byte is written [step 513] into the data buffer memory 20, as described above, so that the filled buffer portion 20B grows. Further, the tracking quality is determined [step 514]. This procedure is repeated, byte-by-byte, until a new track portion is reached [step 521] or a new ECC block is reached [step 531].

In step 521, it is determined whether a new track portion is reached. If so, then a value for Q, valid for the entire track portion 3Px just finished, is calculated [step 522] on the basis of the tracking quality as experienced during reading; for instance, the tracking quality value Q accorded to a track portion may be chosen equal to the lowest tracking quality value experienced during reading of this track portion. The calculated Q is stored in the tracking performance memory 30 [step 523] as described earlier.

In step 531, it is determined whether a new ECC block is reached. If so, then the address of the new ECC block is stored in said ECC start memory [step 502]. Thus, this memory always contains the start address of the ECC block being read.

If, in step 512, it appears that an error occurs, reading is stopped, and processing jumps to a jump strategy procedure 540. The size of the filled portion 20B of the data memory 20 is determined [step 541], and based on this size a maximum jump length is calculated [step 542], which translates into a last memory location in the tracking performance memory 30. Then, the tracking performance memory 30 is analyzed in an analyzing procedure 550.

A variable $Q_{MAX}$, which indicates the maximum value of the tracking quality parameters Q stored in the relevant portion of the tracking performance memory 30, is reset to have value 0 [step 551]. A first memory location in the tracking performance memory 30 is determined [step 552]; this first memory location corresponds to a minimum jump length, which takes into account the address stored in said ECC stair memory: since the error occurred somewhere within an ECC block, the entire ECC block needs to be re-read. In determining the first memory location, a required jump time may be taken into account, and an estimated recovery time may be taken into account, i.e. an estimate (based on experience) of the time needed to regain tracking and focus.

Starting from this first memory location, the value of Q is read [step 553] from the tracking performance memory 30, and compared with $Q_T$ [step 554]. If it appears that Q is above $Q_T$, it is not necessary to search any further: a jump target location is calculated, being a track portion 3P(x-n) corresponding to the current tracking performance memory location [step 571], and a jump towards this target location 3P(x-n) is executed [step 591]. It is noted that 3Px indicates the track portion where the error occurs, whereas n indicates the number of track portions to jump, i.e. the length of the jump.

If, in step 554, it appears that Q is below $Q_T$, Q is compared with said variable $Q_{MAX}$ [step 561]. If it appears that Q is higher than $Q_{MAX}$, the value of Q is stored into said variable $Q_{MAX}$, and the current tracking performance memory location is stored in a variable MEMLOC [step 562]. If it appears that the value of Q is not higher than $Q_{MAX}$, this step 562 is skipped.

Then, the next memory location of the tracking performance memory 30 is considered [step 563]. If this memory location is the above-mentioned last memory location, the analyzing procedure 550 is finished, otherwise the procedure returns to step 553 [decision step 564].

If, in step 564, it appears that the next memory location is the above-mentioned last memory location, it means that Q is nowhere above $Q_T$ (compare FIG. 4C). The jump target location is now determined as being a location having the best Q, i.e. corresponding to the memory location stored in said variable MEMLOC [step 581], and a jump towards this target location is executed [step 591].

After executing the jump, and after having regained tracking and focus, reading is resumed.

As should be clear from the above description, the optical pickup is now positioned at a track location before the start address of the ECC block where the error occurred. The distance to this start address is not a fixed value; after all, in accordance with the invention, the jump target location was a location somewhere before said start address, selected in view of its tracking quality Q. So, it may be that the optical pickup has to travel some track length until it reaches said start address. Therefore, in step 592, it is continuously checked whether said start address has been reached; only then, procedure continues from step 511.

It should be clear to a person skilled in the art that the present invention is not limited to the exemplary embodiments discussed above, but that several variations and modifications are possible within the protective scope of the invention as defined in the appending claims.

For instance, in the above it is described with reference to FIG. 5 that the value of Q is stored into said variable $Q_{MAX}$, and that the current tracking performance memory location is stored into a variable MEMLOC, if $Q>Q_{MAX}$, otherwise this step is skipped. As a result, the variable MEMLOC will contain the tracking performance memory location where the highest Q occurred for the first time, i.e. corresponding to a disc location closest to the location where the error occurred. Alternatively, however, it is also possible that the current tracking performance memory location is stored into said variable MEMLOC if $Q \geqq Q_{MAX}$: this will result in the variable MEMLOC containing the tracking performance memory location where the highest Q occurred for the last time, i.e. corresponding to a disc location most remote from the location where the error occurred.

Further, in the above explanation, the tracking performance memory is analyzed starting at a first memory location corresponding to a small jump and ending at a last memory location corresponding to a large jump. It should be clear that the tracking performance memory may also be analyzed in the opposite direction.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, etc.

The invention claimed is:
1. Method for reading data from a track (3) of a data carrier (2), comprising the steps of:
   tracking the track (3) while reading data from the track (3);
   using a tracking performance memory which contains information relating to a tracking quality of track portions of the data carrier (2), to determine, in situations where tracking has to be restored, which track portion to jump to for restoring tracking;
   determining if a jump back to a previously read track portion is necessary;

if a jump back to a previously read track portion appears to be necessary, consulting said tracking performance memory to determine a closest target track portion (3P(x-n)) having a sufficient value of the tracking quality parameter (Q); and jumping back (JB) to the target track portion (3P(x-n)) thus determined.

2. Method as claimed in claim 1, further comprising the steps of:

during reading, determining a tracking quality parameter (Q) relating to a track portion (3Px) of the data carrier from which the data is being read;

storing the tracking quality parameter in the tracking performance memory (30) in relation to the corresponding track portion (3Px).

3. Method according to claim 1, wherein a jump back is performed in case of a data read error.

4. Method according to claim 1, wherein the data read from track is put into a buffer memory (20) at a first data rate, and wherein data is taken out from said memory (20) at a second data rate lower than the first data rate, and wherein a jump back is performed in case of a buffer overrun.

5. Method according to claim 2, wherein the tracking quality parameter (Q) is determined on the basis of a tracking error signal.

6. Method according to claim 2, wherein the data carrier is an optical data carrier, and wherein the quality parameter (Q) is determined on the basis of a beam focus error signal.

7. Method according to claim 1, further comprising the steps of:

determining a quality threshold value ($Q_T$); and scanning said tracking performance memory (30) for a memory location containing a tracking quality parameter (Q) having a value above the quality threshold value ($Q_T$);

wherein, if at least one tracking quality parameter (Q) having a value above the quality threshold value ($Q_T$) is found, the target track portion (3P(x-n)) is determined as being the closest track portion, i.e. having the lowest value of n, for which the tracking quality parameter (Q) has a value above the quality threshold value ($Q_T$).

8. Method according to claim 1, further comprising the steps of:

determining a quality threshold value ($Q_T$);

scanning said tracking performance memory (30) for a memory location containing a tracking quality parameter (Q) having a value above the quality threshold value ($Q_T$); and determining a maximum value ($Q_{MAX}$) of the tracking quality parameters (Q) stored in said tracking performance memory (30);

wherein, if not one tracking quality parameter (Q) having a value above the quality threshold value ($Q_T$) is found, the target track portion (3P(x-n)) is determined as being the closest track portion, i.e. having the lowest value of n, for which the tracking quality parameter (Q) has the maximum value ($Q_{MAX}$).

9. Method according to claim 1, further comprising the steps of:

determining a quality threshold value ($Q_T$);

scanning said tracking performance memory (30) for a memory location containing a tracking quality parameter (Q) having a value above the quality threshold value ($Q_T$); and determining a maximum value ($Q_{MAX}$) of the tracking quality parameters (Q) stored in said tracking performance memory (30);

wherein, if not one tracking quality parameter (Q) having a value above the quality threshold value ($Q_T$) is found, the target track portion (3P(x-n)) is determined as being the most remote track portion, i.e. having the highest value of n, for which the tracking quality parameter (Q) has the maximum value ($Q_{MAX}$).

10. Method according to claim 1, wherein, if a jump back to a previously read track portion appears to be necessary, an available jump area (42) of said tracking performance memory (30) is determined;

and wherein only this available jump area (42) of said tracking performance memory (30) is consulted to determine said target track portion.

11. Method according to claim 10 wherein the data read from track is inputted into a buffer memory (20) at a first data rate, and wherein data is taken out from said buffer memory (20) at a second data rate lower than the first data rate;

wherein, if a jump back to a previously read track portion appears to be necessary, a maximum jump length is determined, depending on the filling level of the said buffer memory (20);

and wherein a maximum boundary (41) of said available jump area (42) is determined, corresponding to said maximum jump length.

12. Method according to claim 10, wherein a first memory location of said available jump area (42) is determined, corresponding to a minimum jump length, taking into account one or more of the following parameters:

required jump time;

estimated recovery time;

start address of data block that was being read when the jump back became necessary.

13. Method according to claim 1, wherein the data carrier (2) is a disc-shaped carrier, which is rotated during reading;

wherein the track (3) is in the form of a continuous spiral or in the form of a plurality of mutually substantially concentric circles;

and wherein the track portions (3P) have a track length corresponding to 360°/N, N being an integer which preferably is larger than 10, and which suitably is equal to 64.

14. Data reading apparatus (1), for reading data from a data carrier (2), adapted to perform the method of claim 1.

15. Optical disc drive (1) comprising:

rotation means (4) for rotating an optical disc (2) having a track (3);

an optical pickup (6) for scanning the rotating optical disc (2) using a scan beam (7);

a radial actuator (8) for displacing the scan beam (7) transversely to the track (3);

a controller (10) for controlling the actuator (8) to maintain the scan beam on the track (3), the controller (10) coupled to receive a read signal ($S_R$) from the optical pickup (6);

a data buffer (20) having an input (21) coupled to a data output (11) of the controller (10);

a processing unit for consulting a tracking performance memory which contains information relating to a tracking quality of track portions of the optical disc (2), and to determine, in situations where tracking has to be restored, which track portion to jump to for restoring tracking.

* * * * *